(12) United States Patent
Park

(10) Patent No.: US 7,994,768 B2
(45) Date of Patent: Aug. 9, 2011

(54) CONTROL APPARATUS AND METHOD OF SENSELESS MPPT CONTROL FOR PHOTOVOLTAIC POWER GENERATION SYSTEM

(75) Inventor: Min Won Park, Kimhae-si (KR)

(73) Assignee: Chang Won National University Business Administration, Chang Won, Gyeongsangnam-do (KR)

( * ) Notice: Subject to any disclaimer, the term of this patent is extended or adjusted under 35 U.S.C. 154(b) by 414 days.

(21) Appl. No.: 12/041,348

(22) Filed: Mar. 3, 2008

(65) Prior Publication Data

US 2008/0203994 A1 Aug. 28, 2008

(30) Foreign Application Priority Data

May 9, 2006 (KR) .................. 10-2006-0041598

(51) Int. Cl.
G05F 1/56 (2006.01)
(52) U.S. Cl. ......................................... 323/283; 363/97
(58) Field of Classification Search .................. 323/282, 323/283; 363/95, 97
See application file for complete search history.

(56) References Cited

U.S. PATENT DOCUMENTS

| | | | | |
|---|---|---|---|---|
| 5,923,158 | A * | 7/1999 | Kurokami et al. | 323/299 |
| 7,042,195 | B2 * | 5/2006 | Tsunetsugu et al. | 320/101 |
| 2003/0117822 | A1 * | 6/2003 | Stamenic et al. | 363/132 |
| 2007/0290668 | A1 * | 12/2007 | Chou et al. | 323/299 |
| 2008/0203994 | A1 * | 8/2008 | Park | 323/318 |
| 2008/0278983 | A1 * | 11/2008 | Park | 363/95 |
| 2009/0078300 | A1 * | 3/2009 | Ang et al. | 136/244 |
| 2009/0283128 | A1 * | 11/2009 | Zhang et al. | 136/244 |
| 2009/0284078 | A1 * | 11/2009 | Zhang et al. | 307/82 |

* cited by examiner

Primary Examiner — Jeffrey L Sterrett
(74) Attorney, Agent, or Firm — John K. Park; Park Law Firm

(57) ABSTRACT

The present invention relates to a senseless MPPT control apparatus of a photovoltaic power generation system and a method thereof. The control apparatus includes a current transformer, an A/D converter, a new and old current detector, a new duty ratio detector, an old duty ratio detector, a new and old duty ratio comparator, first and second new and old current comparators, a duty ratio adder, a duty ratio subtractor and a PWM signal generator. A maximum output point of a solar battery cell is tracked by using only one feedback current flowing into a load. Further, feedback factors can be reduced to one. It is possible to simplify the construction of a control circuit and minimize tracking control failure.

2 Claims, 10 Drawing Sheets

PRIOR ART
[FIG. 1]
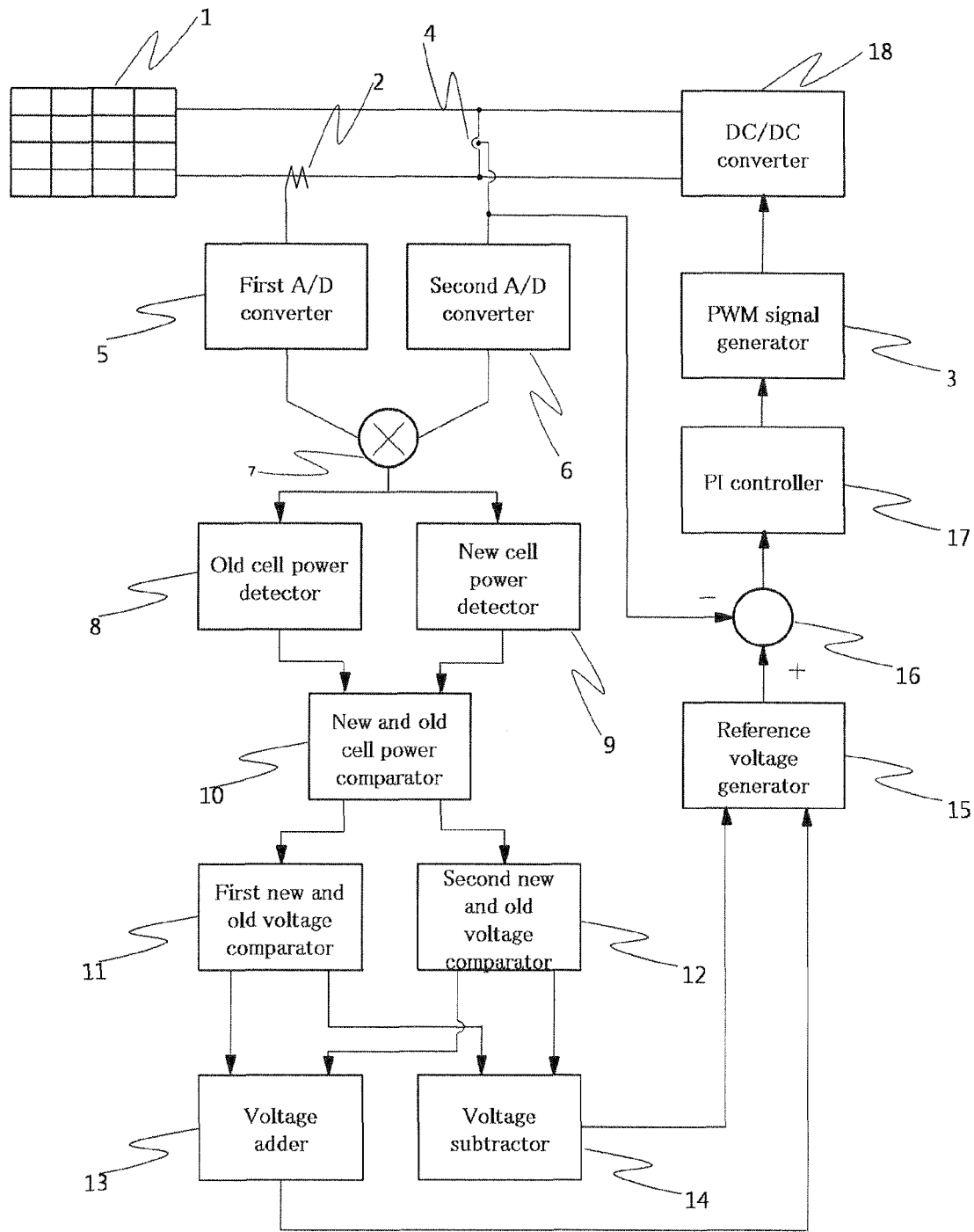

[FIG. 2]
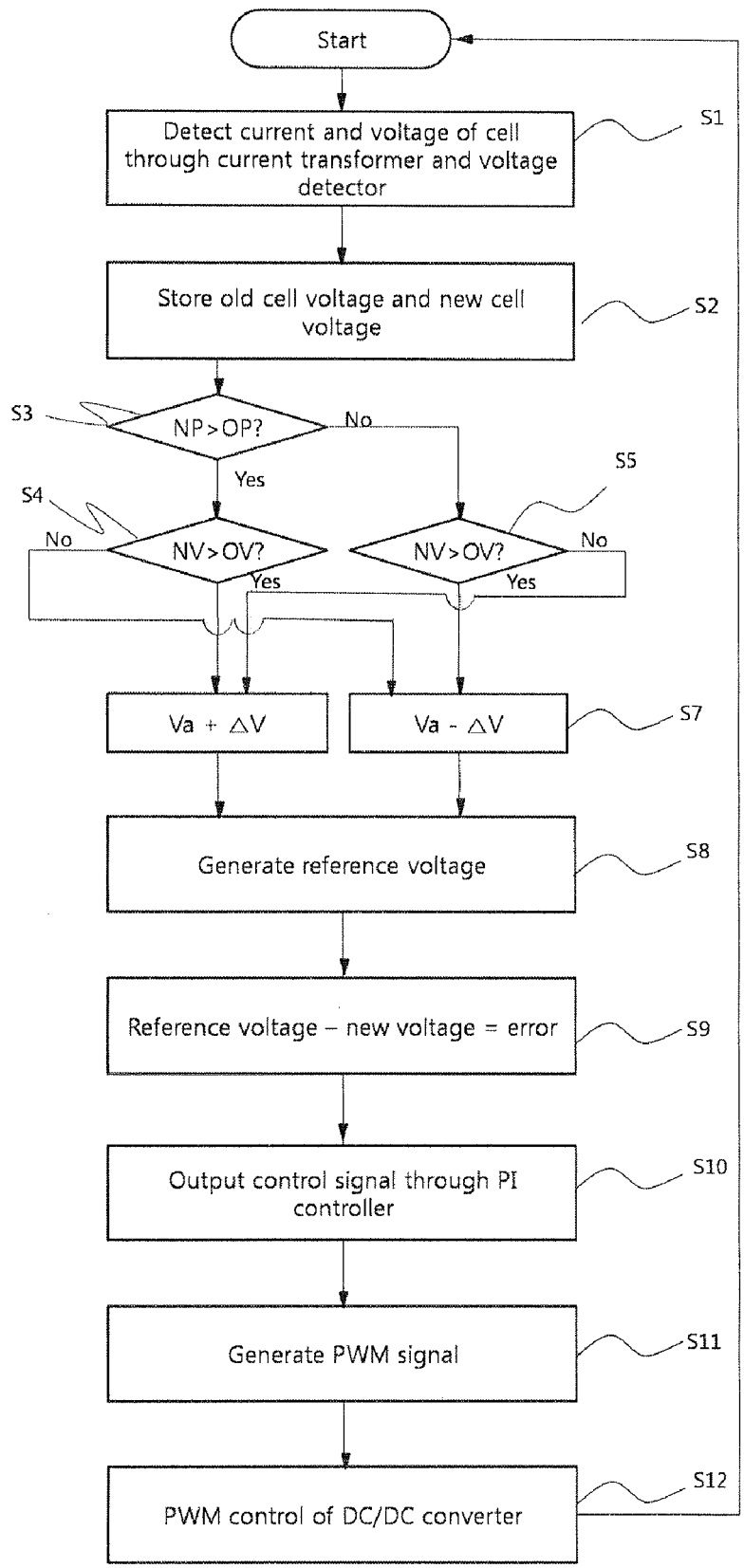

[FIG. 3]
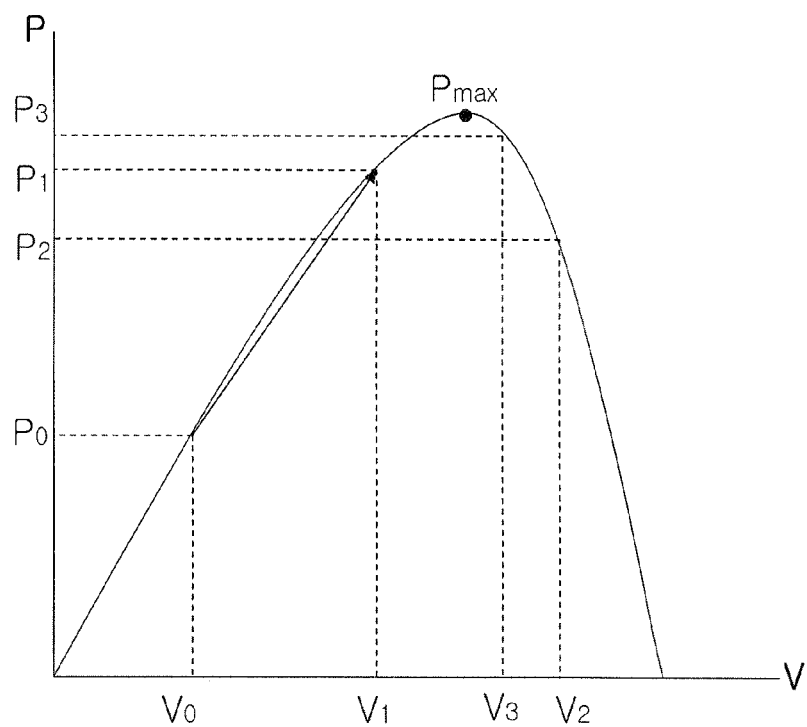

[FIG. 4]
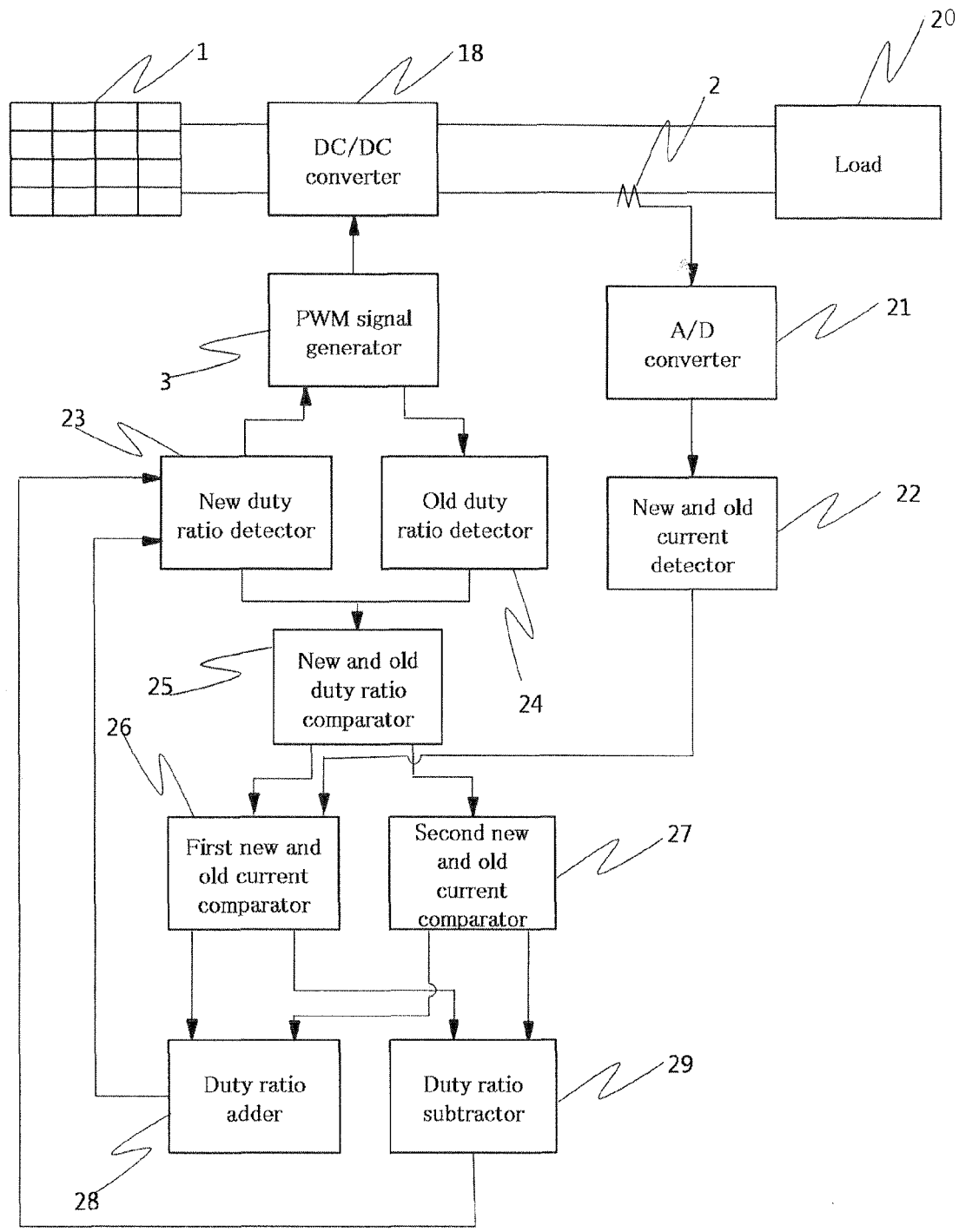

[FIG. 5]
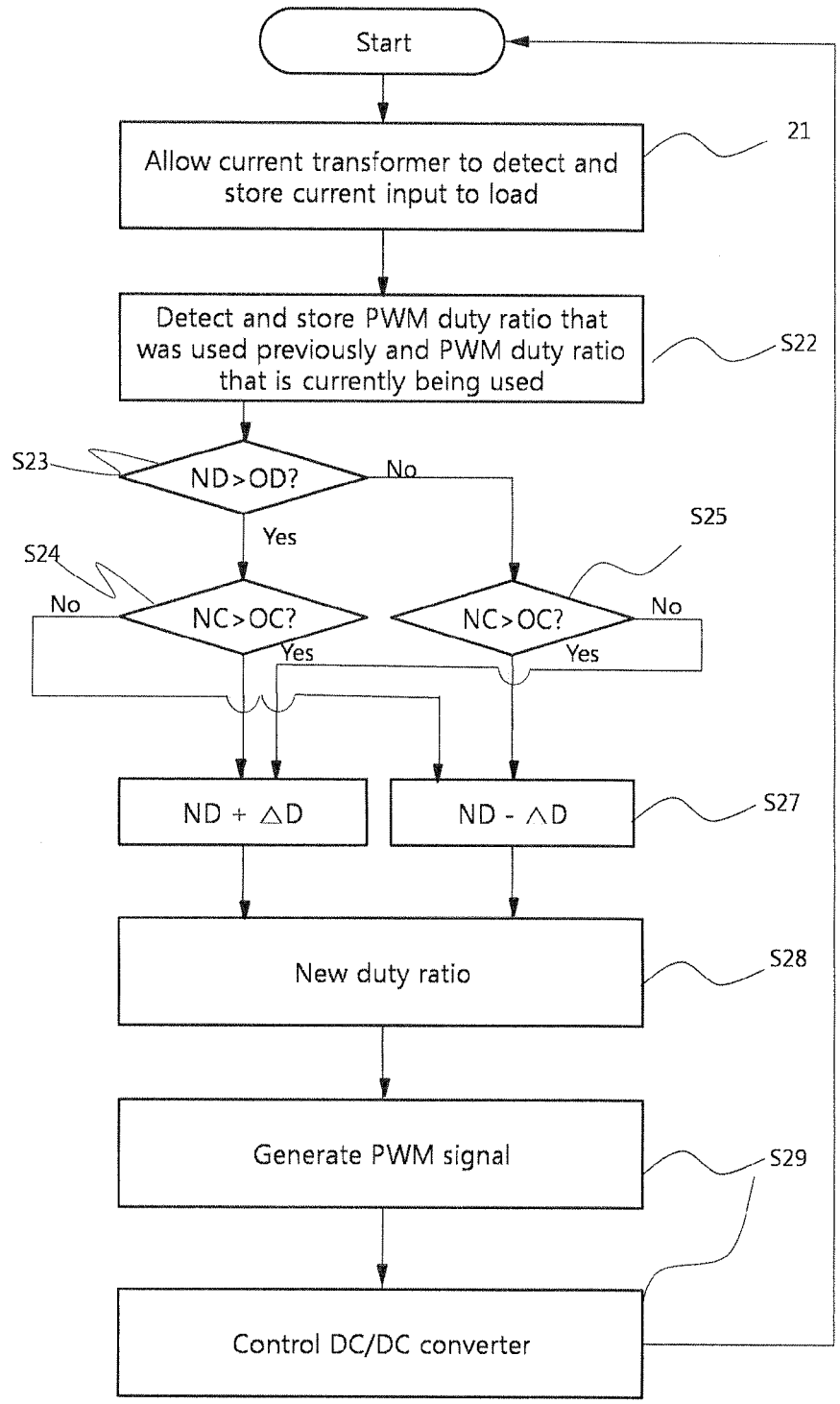

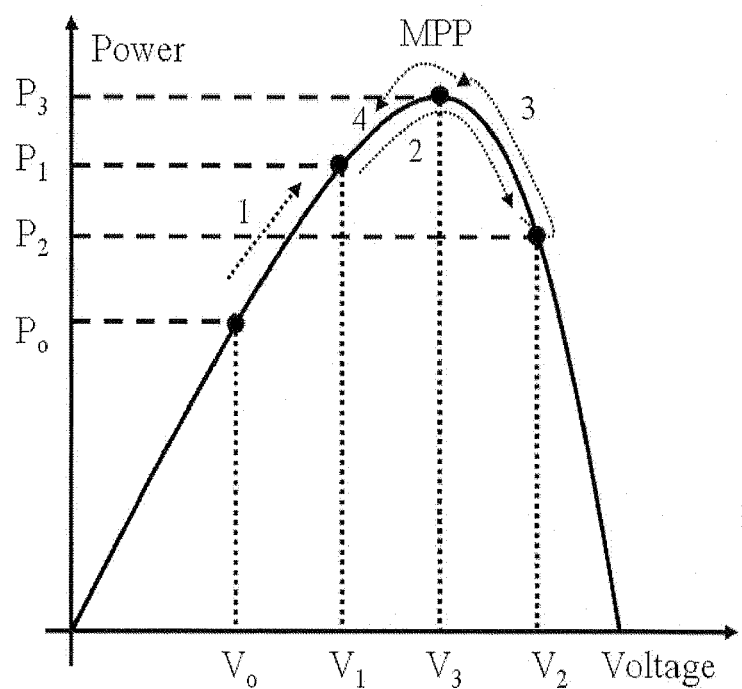
[FIG. 6]

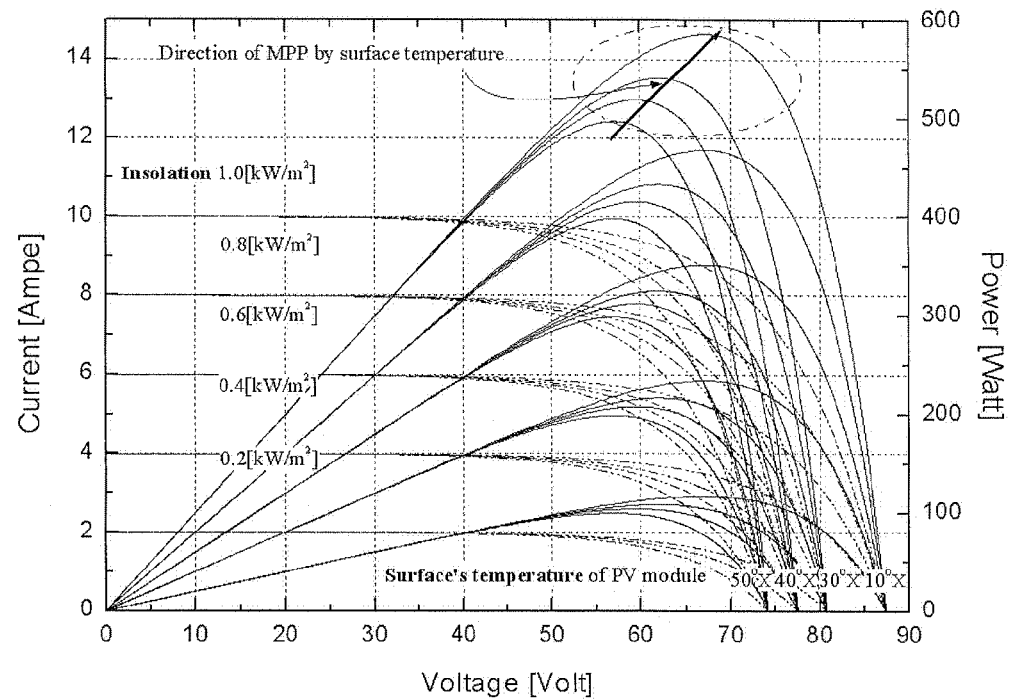
[FIG. 7]

[FIG. 8]
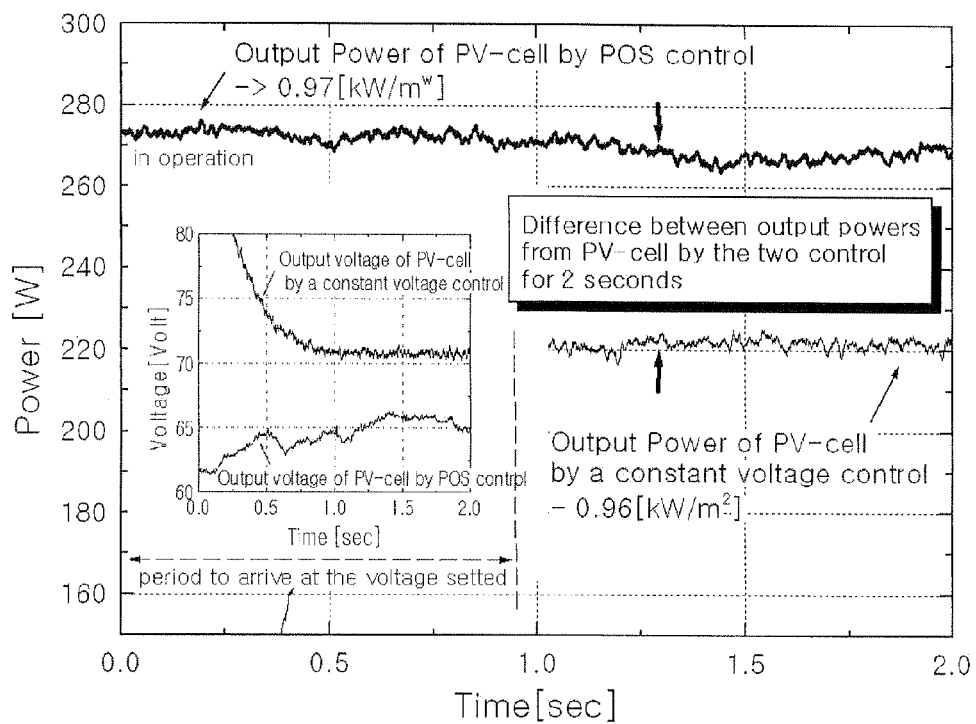

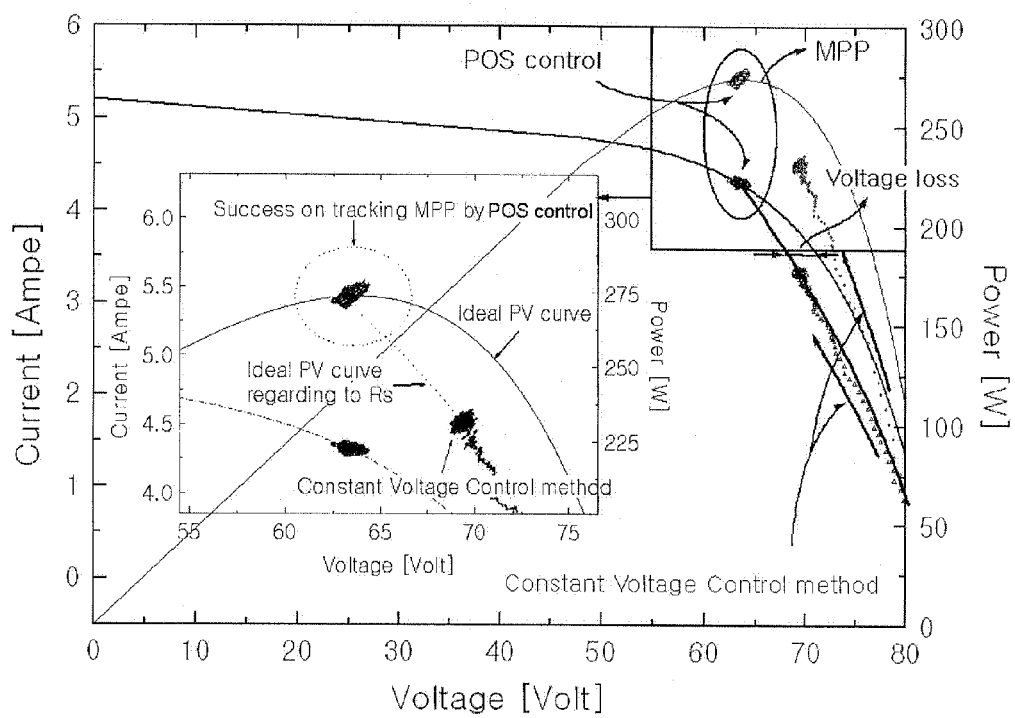
[FIG. 9]

[FIG. 10]
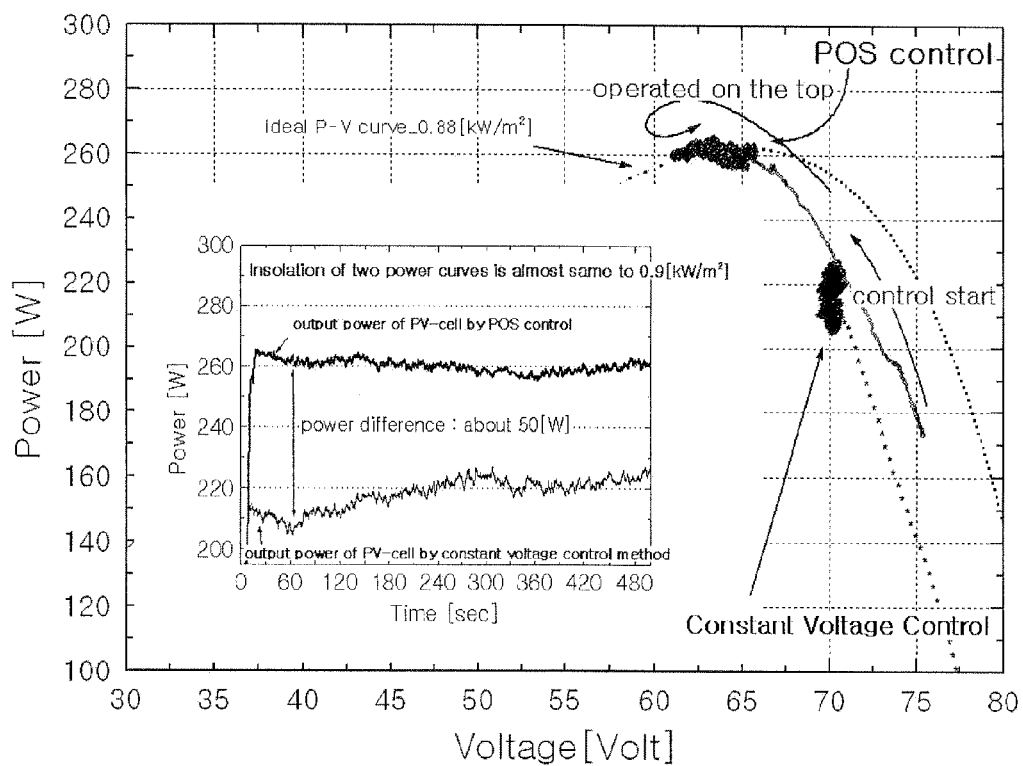

CONTROL APPARATUS AND METHOD OF SENSELESS MPPT CONTROL FOR PHOTOVOLTAIC POWER GENERATION SYSTEM

BACKGROUND OF THE INVENTION

1. Technical Field

The present invention relates to a senseless Maximum Power Point Tracking (hereinafter, referred to as "MPPT") control apparatus of a photovoltaic power generation system and a method thereof, and more particularly, to such a senseless MPPT control apparatus of a photovoltaic power generation system and a method thereof in which a maximum output point of a solar battery cell can be tracked by using only one feedback current flowing into a load, thus always producing an optimal output, and feedback factors are reduced to one, thus further simplifying the construction of a control circuit and minimizing tracking control failure.

2. Background Art

In general, a MPPT control method of a photovoltaic power generation system can be largely divided into a power comparison method and a constant voltage control method.

In the power comparison method of the MPPT control method, as shown in FIGS. 1 and 2, a solar battery cell 1 made of crystalline silicon (single crystalline or polycrystalline), amorphous silicon, compound semiconductor or the like and configured to transform photoelectromotive force into electric energy generates current and voltage as analog signals. A current transformer 2 and a voltage detector 4 detect the current and voltage, respectively, through sampling in real-time (S1). First and second A/D converters 5, 6 convert the current and voltage into current and voltage of digital signals and output the converted current and voltage to a power calculation unit 7. The power calculation unit 7 calculates power based on the current and voltage and stores the results (S2).

An old cell power detector 8 and a new cell power detector 9 detect an old cell power OP and a new cell power NP, respectively, from the signals of the power calculation unit 7, and transfer the detected old and new cell powers OP and NP to a new and old cell power comparator 10. The new and old cell power comparator 10 compares the received old and new cell powers OP and NP to determine whether the new cell power NP is greater than the old cell power OP (S3).

If, as a result of the comparison, the new cell power is greater than the old cell power (NP>OP; Yes in step S3), the new cell power NP and the old cell power OP are transferred to a first new and old voltage comparator 11 that compares a new cell voltage NV and an old cell voltage OV at that state. If, as a result of the comparison, the new cell power is smaller than the old cell power (NP<OP; No in step S3), the new cell power NP and the old cell power OP are transferred to a second new and old voltage comparator 12 that compares a new cell voltage NV and an old cell voltage OV at that state.

The first and second new and old voltage comparators 11, 12 compare the new cell voltage NV and the old cell voltage OV at their states (S4, S5), and output the comparison results to a voltage adder 13 and a voltage subtractor 14, respectively.

The voltage adder 13 adds a voltage shift ΔV to a voltage value Vd, which was measured and stored one sampling earlier than a value that is currently input, depending on the output values of the first and second new and old voltage comparators 11, 12 (S6). For example, if the NP is grater than the OP (Yes in step S3) and the NV is greater than the OV (Yes in step S4), the voltage adder 13 adds the voltage shift ΔV to the voltage value Vd, which was measured and stored one sampling earlier than a currently input value, and outputs the resulting value to a reference voltage generator 15. If the NP is smaller than the OP (No in step S3) and the NV is smaller than the OV (No in step S5), the voltage adder 13 adds the voltage shift ΔV to the voltage value Vd, which was measured and stored one sampling earlier than a currently input value, and outputs the resulting value to the reference voltage generator 15.

Further, the voltage subtractor 14 subtracts the voltage shift ΔV from the voltage value Vd, which was measured and stored one sampling earlier than a currently input value, depending on the output values of the first and second new and old voltage comparators 11, 12 (S7). For example, if the NP is greater than the OP (Yes in step S3) and the NV is smaller than the OV (No in step S4), the voltage subtractor 14 subtracts the voltage shift ΔV from the voltage value Vd, which was measured and stored one sampling earlier than a currently input value, and outputs the resulting value to the reference voltage generator 15. If the NP is smaller than the OP (No in step S3) and the NV is greater than the OV (Yes in step S5), the voltage subtractor 14 subtracts the voltage shift ΔV from the voltage value Vd, which was measured and stored one sampling earlier than a currently input value, and outputs the resulting value to the reference voltage generator 15.

The reference voltage generator 15 generates a new reference voltage based on the voltage (S8). A subtractor 16 receives the reference voltage from the reference voltage generator 15, subtracts an output voltage of the solar battery cell 1, which is output to the voltage detector 15, from the reference voltage, to calculate an error value (S9), and outputs the error value to a PI controller 17.

The PI controller 17 outputs a control signal, corresponding to the error value, to a PWM signal generator 3 (S10).

A pulse width of the control signal, output from the PWM signal generator 3, is converted accordingly in real-time and then output to a DC/DC converter 18 (S11). Thus, a maximum output point can be tracked in response to shift in voltage and current of the solar battery cell 1 in which a DC voltage, output from the DC/DC converter 18 for supplying voltage from the solar battery cell 1 to each load, is shifted every moment. The tracked maximum output point can be supplied in real-time (S12).

Meanwhile, FIG. 3 shows a power-voltage characteristic curve of a solar battery cell. Assuming that a point where MPPT control begins is 0 ($P_0$, $V_0$), a point 1 is $P_1$, $V_1$, a point 2 is $P_2$, $V_2$, and a point 3 is $P_3$, $V_3$, V is increased (+) and P is also increased (+) at the point 0 in order to track the maximum power. In the case of a course 1 from the point 0 to the point 1 and then a course 2 from the point 1 to the point 2, V is increased (+), but P is decreased (−). Thus, the voltage shift ΔV has to be decreased (−) in order to track the maximum power.

Further, if the course 2 changes to a course 3 from the point 2 to the point 3, V is decreased (−), but P is increased (+). However, for maximum value tracking, the voltage shift ΔV must be decreased (−). After the course 3 (an opposite side after the maximum point), V is decreased (−) and P is also decreased (−). Thus, the voltage shift ΔV must be increased (+) (a course 4).

(where a control factor is voltage V and power P=current I)

An algorithm with respect to the conventional MPPT control scheme as described above can be expressed in the following table 1.

TABLE 1

| Course | V | P | ΔV |
|---|---|---|---|
| 0 -> 1 | + | + | + |
| 1 -> 2 | + | - | - |
| 2 -> 3 | - | + | - |
| 3 -> 4 | - | - | + |

In this case, all the remaining constituent elements other than the current transformer 2, the voltage detector 4 and the DC/DC converter 18 can be built in one processor, although they are separately shown in the drawing.

However, the power comparison method described above is adapted to operate at the maximum output point based on an output power and voltage of the solar battery cell. Thus, two sensors, that is, a current transformer and a voltage detector are required at the output terminal of the solar battery cell. Further, two A/D converters are also required at the processor in order to calculate a current and voltage, input as an analog signal from the current transformer and the voltage detector, based on the algorithm as shown in FIG. 2. In addition, a calculation process is also relatively complicated since such calculation is performed based on two inputs.

In other words, the power comparison method of the conventional MPPT control method is of a type in which an increase and decrease are compared between an output voltage and current of the solar battery cell and a feedback power and voltage thereof in order to track a maximum output always. This control method has a complicated control algorithm and is problematic in that there is a significant danger of tracking control failure.

Meanwhile, the constant voltage control method has a simplified control algorithm since only an output voltage of the solar battery cell is feedbacked. Thus, a danger of tracking control failure can be minimized and control stability can be maximized. However, an optimal output cannot be always output because an output voltage of the solar battery cell is fixed.

Accordingly, it is a fact that the conventional MPPT control method has a specific shortcoming in each control method.

SUMMARY OF THE INVENTION

Technical Problem

Accordingly, the present invention has been made in an effort to solve the above problems occurring in the prior art, and an object of the present invention is to provide an senseless MPPT control apparatus of a photovoltaic power generation system and a method thereof, and more particularly, to such a senseless MPPT control apparatus of a photovoltaic power generation system and a method thereof in which a maximum output point of a solar battery cell can be tracked by using only one feedback current flowing into a load, thus always producing an optimal output, and feedback factors are reduced to one, thus further simplifying the construction of a control circuit and minimizing tracking control failure.

Technical Solution

To achieve the above object, an apparatus of the present invention includes a current transformer for detecting an output current of a DC/DC converter, which DC/DC-converts an output voltage of a solar battery cell and inputs a converted voltage to a load; an A/D converter for converting a load current, output as an analog signal from the current transformer, into a digital signal; a new and old current detector for detecting a new current and an old current, respectively, which are introduced to the load, from current values output from the A/D converter, and storing the detected new current and the old current; a new duty ratio detector for detecting a new duty ratio from output signals of a duty ratio adder and a duty ratio subtractor and storing the detected duty ratio; an old duty ratio detector for detecting an old duty ratio from an output signal of a PWM signal generator and storing the detected duty ratio; a new and old duty ratio comparator for comparing the output signal of the new duty ratio detector and the output signal of the old duty ratio detector; first and second new and old current comparators for receiving a comparison result value of the new and old duty ratio comparator and the new current and the old current of the new and old current detector, comparing the new current and the old current when the new duty ratio is greater than the old duty ratio or the new duty ratio is smaller than the old duty ratio, and outputting output values corresponding to the comparison results to the duty ratio adder and the duty ratio subtractor, respectively; the duty ratio adder for adding a duty ratio shift to the new duty ratio to produce a new duty ratio, if predetermined output signals are respectively input from the first and second new and old current comparators; the duty ratio subtractor for subtracting the duty ratio shift from the new duty ratio to produce a new duty ratio, if predetermined output signals are respectively input from the first and second new and old current comparators; and the PWM signal generator for, if the new duty ratio, which has been increased or decreased according to the new duty ratios output from the duty ratio adder and the duty ratio subtractor, is input through the new duty ratio detector, modulating (PWM) a pulse width of a control signal according to the duty ratio, and outputting the result to the old duty ratio detector or the DC/DC converter.

To achieve the above object, a method of the present invention includes a step of allowing the new and old current detector, connected to the current transformer, to detect a current introduced to the load, and to store the detected current; a step of detecting a PWM duty ratio that was used previously and a PWM duty ratio that is currently being used and storing the detected PWM duty ratios; a step of determining whether the new duty ratio is greater than the old duty ratio; a step of, if as a result of the comparison, the new duty ratio is greater than the old duty ratio or the new duty ratio is smaller than the old duty ratio, determining whether a new current is greater than an old current; a step of, if, as a result of the comparison, the new duty ratio is greater than the old duty ratio and the new current is greater than the old current or the new duty ratio is smaller than the old duty ratio and the new current is smaller than the old current, adding a duty ratio shift ratio to the new duty ratio to produce a new duty ratio; a step of, if, as a result of the comparison, the new duty ratio is greater than the old duty ratio and the new current is smaller than the old current or the new duty ratio is smaller than the old duty ratio and the new current is greater than the old current, subtracting the duty ratio shift ratio from the new duty ratio to produce a new duty ratio; and a step of allowing the PWM signal generator to generate a PWM signal corresponding to the new duty ratio and to control the DC/DC converter.

Advantageous Effects

As described above, according to the present invention, a maximum output point of a solar battery cell can be tracked by using only one feedback current flowing into a load, thus always producing an optimal output. Further, feedback factors are reduced to one, further simplifying the construction of a control circuit and minimizing tracking control failure.

BRIEF DESCRIPTION OF THE DRAWINGS

Further objects and advantages of the invention can be more fully understood from the following detailed description taken in conjunction with the accompanying drawings in which:

FIG. 1 is a block diagram of a power comparison apparatus of a conventional photovoltaic power generation system;

FIG. 2 is a flowchart illustrating a conventional power comparison method;

FIG. 3 shows a power-voltage characteristic curve of a solar battery cell;

FIG. 4 is a block diagram of an apparatus of the present invention;

FIG. 5 is a flowchart illustrating a method of the present invention;

FIG. 6 shows a power-voltage characteristic curve according to the present invention;

FIG. 7 shows a power-voltage and voltage-current characteristic curve of a PV array used in an experiment using the apparatus of the present invention;

FIG. 8 is a graph showing the comparison of output power of a solar battery cell based on the maximum input current control and constant voltage control for 2 seconds according to the present invention;

FIG. 9 is an operating characteristic graph of a power-voltage & voltage-current characteristic curve for 10 seconds according to the present invention; and FIG. 10 is a graph showing the comparison of output characteristics of maximum input current control and constant voltage control for 500 seconds according to the present invention.

| *Description on reference numerals* |
|---|
| 1: solar battery cell |
| 2: current transformer |
| 3: PWM signal generator |
| 18: DC/DC converter |
| 20: load |
| 21: A/D converter |
| 22: new and old current detector |
| 23: new duty ratio detector |
| 24: old duty ratio detector |
| 25: new and old duty ratio comparators |
| 26, 27: first and second new and old current comparators |
| 28: duty ratio adder |
| 29: duty ratio subtractor |

DETAILED DESCRIPTION EMBODIMENTS OF THE INVENTION

FIG. 4 is a block diagram of an apparatus of the present invention. FIG. 5 is a flowchart illustrating a method of the present invention. FIG. 6 shows a power-voltage characteristic curve according to the present invention. FIG. 7 shows a power-voltage and voltage-current characteristic curve of a PV array used in an experiment using the apparatus of the present invention.

Furthermore, FIG. 8 is a graph showing the comparison of output power of a solar battery cell based on the maximum input current control and constant voltage control for 2 seconds according to the present invention. FIG. 9 is an operating characteristic graph of a power-voltage & voltage-current characteristic curve for 10 seconds according to the present invention. FIG. 10 is a graph showing the comparison of output characteristics of the maximum input current control and constant voltage control for 500 seconds according to the present invention.

The control apparatus of the present invention includes a current transformer 2 for detecting an output current of a DC/DC converter 18, which DC/DC-converts an output voltage of a solar battery cell 1 and inputs a converted voltage to a load 20;

an A/D converter 21 for converting a load current, output as an analog signal from the current transformer 2, into a digital signal;

a new and old current detector 22 for detecting a new current NC and an old current OC, respectively, which are introduced to the load 20, from current values output from the A/D converter 21;

a new duty ratio detector 23 for detecting a new duty ratio ND from output signals of a duty ratio adder 28 and a duty ratio subtractor 29 and storing the detected duty ratio;

an old duty ratio detector 24 for detecting an old duty ratio OD from an output signal of a PWM signal generator 3 and storing the detected duty ratio;

a new and old duty ratio comparator 25 for comparing the output signal of the new duty ratio detector 23 and the output signal of the old duty ratio detector 24;

first and second new and old current comparators 26, 27 for receiving a comparison result value of the new and old duty ratio comparator 25 and the new current NC and the old current OC of the new and old current detector 22, comparing the new current NC and the old current OC when the new duty ratio ND is greater than the old duty ratio OD (ND>OD) or the new duty ratio ND is smaller than the old duty ratio OD (ND<OD), and outputting output values corresponding to the comparison results to the duty ratio adder 28 and the duty ratio subtractor 29, respectively;

the duty ratio adder 28 for adding a duty ratio shift ΔD to the new duty ratio ND to produce a new duty ratio, if predetermined output signals are respectively input from the first and second new and old current comparators 26, 27;

the duty ratio subtractor 29 for subtracting the duty ratio shift ΔD from the new duty ratio ND to produce a new duty ratio, if predetermined output signals are respectively input from the first and second new and old current comparators 26, 27; and the PWM signal generator 3 for, if the new duty ratio ND, which has been increased or decreased according to the new duty ratios output from the duty ratio adder 28 and the duty ratio subtractor 29, is input through the new duty ratio detector 23, modulating (PWM) a pulse width of a control signal according to the duty ratio, and outputting the result to the old duty ratio detector 24 or the DC/DC converter 18.

Further, a control method of the present invention includes:

a step (S21) of allowing a new and old current detector 22, connected to the current transformer 2, to detect a current introduced to the load 20, and to store the detected current;

a step (S22) of allowing the new and old duty ratio detectors 23, 24 to detect a PWM duty ratio that was used previously and a PWM duty ratio that is currently being used and to store the detected PWM duty ratios;

a step (S23) of determining whether the new duty ratio ND is greater than the old duty ratio OD;

a step (S24, S25) of, if as a result of the comparison, the new duty ratio ND is greater than the old duty ratio OD (Yes in step S23) or the new duty ratio ND is smaller than the old duty ratio OD (No in step S23), determining whether a new current NC is greater than an old current OC;

a step (S26, S28) of, if, as a result of the comparison, the new duty ratio is greater than the old duty ratio (ND>OD) and the new current is greater than the old current (NC>OC) or the new duty ratio is smaller than the old duty ratio (ND<OD) and the new current is smaller than the old current (NC<OC), adding a duty ratio shift ratio ΔD to the new duty ratio ND (ND+ΔD) to produce a new duty ratio;

a step (S27, S28) of, if, as a result of the comparison, the new duty ratio is greater than the old duty ratio (ND>OD) and the new current is smaller than the old current (NC<OC) or the new duty ratio is smaller than the old duty ratio (ND<OD) and the new current is greater than the old current (NC>OC), subtracting the duty ratio shift ratio ΔD from the new duty ratio ND (ND+ΔD) to produce a new duty ratio; and a step (S29) of allowing the PWM signal generator 3 to generate a PWM signal corresponding to the new duty ratio and to control the DC/DC converter 18.

Mode for Invention

The present invention will now be described in detail in connection with specific embodiments with reference to the accompanying drawings.

A system of the present invention largely includes the solar battery cell 1, the DC/DC converter 18, the current transformer 2, the A/D converter 21, the new and old current detector 22, the new and old duty ratio detectors 23, 24, the new and old duty ratio comparator 25, the first and second new and old current comparators 26, 27, the duty ratio adder 28, the duty ratio subtractor 29, and the PWM signal generator 3.

If a voltage output from the solar battery cell 1 is DC/DC-converted through the DC/DC converter 18 and then supplied to the load 20, the current transformer 2 detects a current input to the load 20.

The A/D converter 21 converts a load current, output as an analog signal from the current transformer 2, into a digital signal and inputs the converted current to the new and old current detector 22. The new and old current detector 22 detects a new current NC and an old current OC, respectively, which are input to the load 20.

Meanwhile, the new duty ratio detector 23 detects a new duty ratio ND from output signals of the duty ratio adder 28 and the duty ratio subtractor 29, and stores the detected new duty ratio ND. The old duty ratio detector 24 detects an old duty ratio OD from an output signal of the PWM signal generator 3, and stores the detected old duty ratio OD.

The new and old duty ratio comparator 25 compares an output signal of the new duty ratio detector 23 and an output signal of the old duty ratio detector 24, and outputs the comparison results to the first and second new and old current comparators 26, 27, respectively.

The first and second new and old current comparators 26, 27 receive the comparison result value of the new and old duty ratio comparator 25 and the new current NC and the old current OC of the new and old current detector 22, respectively, compare the new current NC and the old current OC when the new duty ratio ND is greater than the old duty ratio OD (ND>OD) and the new duty ratio ND is smaller than the old duty ratio OD (ND<OD), respectively, and output output values corresponding to the comparison results to the duty ratio adder 28 and the duty ratio subtractor 29, respectively.

If predetermined output signals are respectively input from the first and second new and old current comparators 26, 27, the duty ratio adder 28 adds a duty ratio shift ΔD to the new duty ratio ND and produces a new duty ratio. If predetermined output signals are respectively input from the first and second new and old current comparators 26, 27, the duty ratio subtractor 29 subtracts the duty ratio shift ΔD from the new duty ratio ND and produces a new duty ratio.

The PWM signal generator 3 receives the new duty ratios output from the duty ratio adder 28 and the duty ratio subtractor 29 through the new duty ratio detector 23, modulates (PWM) a pulse width of a control signal according to an increased or decreased duty ratio, and outputs the modulated signal to the old duty ratio detector 24 and the DC/DC converter 18. Accordingly, an output voltage of the solar battery cell 1, which is output from the DC/DC converter 18 and then supplied to the load, can be output to the load 20 in an optimal state always.

In other words, in the present invention, the new and old current detector 22 detects and stores a current of the load 20, which is detected through one current transformer 2 (S21). The new and old duty ratio detectors 23, 24 detect and store a PWM duty ratio OD that was used previously and a PWM duty ratio ND that is currently being used, respectively (S22).

The new and old duty ratio comparator 25 receives the output signals of the new duty ratio detector 23 and the old duty ratio detector 24, respectively, determines whether the new duty ratio ND is greater than the old duty ratio OD (S23), and transfers the comparison results to the first and second new and old and current comparators 26, 27.

That is, the new and old duty ratio comparator 25 determines whether the new duty ratio ND is greater than the old duty ratio OD (S23). If, as a result of the determination, the new duty ratio ND is greater than the old duty ratio OD (Yes in step S23), the new and old duty ratio comparator 25 transfers the comparison result to the first new and old current comparator 26. If, as a result of the determination, the new duty ratio ND is smaller than the old duty ratio OD (No in step S23), the new and old duty ratio comparator 25 transfers the comparison result to the second new and old current comparator 27.

If the comparison result of the new duty ratio ND and the old duty ratio OD is input from the new and old duty ratio comparator 25, the first and second new and old current comparators 26, 27 receive the new current NC and the old current OC stored in the new and old current detector 22, respectively, compare the new current NC and the old current OC when the new duty ratio ND is greater than the old duty ratio OD (ND>OD) and the new duty ratio ND is smaller than the old duty ratio OD (ND<OD), and output values, corresponding to the comparison results, to the duty ratio adder 28 and the duty ratio subtractor 29, respectively.

In other words, in the state where the new duty ratio ND is greater than the old duty ratio OD (Yes in step S23), if the new current NC is greater than the old current OC (Yes in step S24) as a result of the comparison result (S24) of the new current NC and the old current OC in the first new and old current comparator 26, the first new and old current comparator 26 transfers the result to the duty ratio adder 28. If the new current NC is smaller than the old current OC (No in step S24), the first new and old current comparator 26 transfers the result to the duty ratio subtractor 29.

Furthermore, in the state where the new duty ratio ND is smaller than the old duty ratio OD (No in step S23), if the new current NC is greater than the old current OC (Yes in step S25) as a result of the comparison result (S25) of the new current NC and the old current OC in the second new and old current comparator 27, the second new and old current comparator 27 transfers the result to the duty ratio subtractor 29. If the new current NC is smaller than the old current OC (Yes in step S25), the second new and old current comparator 27 transfers the result to the duty ratio adder 28.

As described above, if a result is transferred from the first new and old current comparator 26 to the duty ratio adder 28 since the new duty ratio ND is greater than the old duty ratio OD (ND>OD) and the new current NC is greater than the old current OC (NC>OC) or the new duty ratio ND is smaller than the old duty ratio OD (ND<OD) and the new current NC is smaller than the old current OC (NC<OC) as a result of the comparison in the first new and old current comparator 26, the duty ratio adder 28 adds a predetermined duty ratio shift ratio $\Delta D$ to the new duty ratio ND (ND+$\Delta D$) (S26) to produce a new duty ratio (S28), and transfers the new duty ratio to the PWM signal generator 3 through the new duty ratio detector 23.

Furthermore, if a result is transferred from the second new and old current comparator 27 to the duty ratio subtractor 29 since the new duty ratio ND is greater than the old duty ratio OD (ND>OD) and the new current NC is smaller than the old current OC (NC<OC) or the new duty ratio ND is smaller than the old duty ratio OD (ND<OD) and the new current NC is greater than the old current OC (NC>OC) as a result of the comparison in the second new and old current comparator 27, the duty ratio subtractor 29 subtracts a predetermined duty ratio shift ratio $\Delta D$ from the new duty ratio ND (ND–$\Delta D$) (S27) to produce a new duty ratio (S28), and transfers the new duty ratio to the PWM signal generator 3 through the new duty ratio detector 23.

Thus, the PWM signal generator 3 generates a PWM signal corresponding to the new duty ratio output from the duty ratio adder 28 or the duty ratio subtractor 29, and controls the DC/DC converter 18 (S29).

As described above, in the present invention, an output voltage from the solar battery cell 1 is increased or decreased based on the feedback of the current input to the load 20. In this case, it can be seen that a voltage at the input terminal of the DC/DC converter 18 is increased or decreased depending on an increase or decrease of a duty ratio according to the control signal of the DC/DC converter 18.

In other words, if an on-time of the PWM signal output from the PWM signal generator 3 is great, the voltage at the input terminal of the DC/DC converter 18 is decreased and an introduced current is increased. If the on-time of the PWM signal output from the PWM signal generator 3 is small, the voltage at the input terminal of the DC/DC converter 18 is increased and the introduced current is decreased. Thus, an output voltage of the solar battery cell 1, which is output through the DC/DC converter 18 under the control of the PWM signal generator 3, can be supplied to the load 20 as an optimal state always.

Meanwhile, it can be said that the relationship of the current I and the voltage P output from the solar battery cell 1 is in inverse proportion to each other, as in the V-I characteristic curve of the solar battery cell. For example, the greater the on-time of the DC/DC converter 18, the more the current and the smaller the voltage.

In other words, it can be seen that if the duty ratio increases (switching is a lot), the voltage is decreased, and if the duty ratio is reduced (switching is small), the voltage is increased.

In this case, the duty ratio is controlled by the PWM signal generator 3. If an increment and decrement of the duty ratio are known to the PWM signal generator 3, it is not necessary to separately feedback an increment and decrement (+, –) of the voltage (V) component.

An input current I of the load 20 is proportional to the output power P of the solar battery cell 1. Thus, it can be seen that the current I is the same as the P component of the conventional MPPT as in a table 2.

TABLE 2

| Algorithm of PV output senseless control method | | | | | |
|---|---|---|---|---|---|
| Course | Duty Ratio | V | I = (p) | $\Delta D$ | $\Delta$ |
| 1 $V_0 \to v_1$ | – | + | +(+) | – | + |
| 2 $v_1 \to v_2$ | – | + | –(–) | + | – |
| 3 $v_2 \to v_3$ | + | – | +(+) | – | – |
| 4 $v_3 \to v_4$ | + | – | –(–) | + | + |

Further, FIG. 6 shows a power-voltage characteristic curve according to the present invention. Referring to FIG. 6, P=I, V=duty ratio, $\Box V = \Box$duty ratio, where the duty ratio is controlled by a PWM signal (this is true of an increase and decrease of $\Box V$). Thus, a factor to be controlled includes only the current I.

Thus, it can be seen that the apparatus and method of the present invention are much simpler than the conventional method without a feedback voltage as in the prior art.

An experiment in which the control method of the present invention was applied to a PV-SPE system that was actually fabricated (it was considered as a load whose input power and current were increased as the output of a solar battery cell increased) revealed that the method of the present invention had a better output characteristic than that of the conventional MPPT control method as in the power-voltage and voltage-current characteristic curve of a PV array used in the experiment, which was conducted according to the apparatus of the present invention shown in FIG. 7.

In the present invention, a factor to be considered, when controlling an actual PV-SPE system, includes only a current input to a SPE system. Thus, it was found that the output of a solar battery cell could be tracked to the greatest extent and power input to the SPE system could be maintained to the maximum extent.

FIG. 8 is a graph showing the comparison of output power of a solar battery cell based on the maximum input current control and constant voltage control for 2 seconds according to the present invention. FIG. 9 is an operating characteristic graph of a power-voltage & voltage-current characteristic curve for 10 seconds according to the present invention. FIG. 10 is a graph showing the comparison of output characteristics of maximum input current control and constant voltage control for 500 seconds according to the present invention.

From the graphs showing the operating characteristic results of experiments for a short time (FIGS. 8 and 9) and a long time (FIG. 10), it can be seen that the output of the photovoltaic power generation system has a better output characteristic than that of the existing constant voltage control method.

In particular, from FIG. 9, it can be seen that the control method of the present invention operates at a maximum output point, whereas the conventional constant voltage control method operates at a point that does not reach the maximum output point.

INDUSTRIAL APPLICABILITY

As described above, according to the present invention, a maximum output point of a solar battery cell can be tracked by using only one feedback current flowing into a load. Thus, an optimal output can be output always. Further, feedback factors can be reduced to one. It is therefore possible to simplify the construction of a control circuit and minimize tracking control failure.

Although the specific embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A senseless MPPT control apparatus of a photovoltaic power generation system, comprising:
a current transformer for detecting an output current of a DC/DC converter, which DC/DC-converts an output voltage of a solar battery cell and inputs a converted voltage to a load;
an A/D converter for converting a load current, output as an analog signal from the current transformer, into a digital signal;
a new and old current detector for detecting a new current and an old current, respectively, which are introduced to the load, from current values output from the A/D converter, and storing the detected new current and the old current;
a new duty ratio detector for detecting a new duty ratio from output signals of a duty ratio adder and a duty ratio subtractor and storing the detected duty ratio;
an old duty ratio detector for detecting an old duty ratio from an output signal of a PWM signal generator and storing the detected duty ratio;
a new and old duty ratio comparator for comparing the output signal of the new duty ratio detector and the output signal of the old duty ratio detector;
first and second new and old current comparators for receiving a comparison result value of the new and old duty ratio comparator and the new current and the old current of the new and old current detector, comparing the new current and the old current when the new duty ratio is greater than the old duty ratio or the new duty ratio is smaller than the old duty ratio, and outputting output values corresponding to the comparison results to the duty ratio adder and the duty ratio subtractor, respectively;
the duty ratio adder for adding a duty ratio shift to the new duty ratio to produce a new duty ratio, if predetermined output signals are respectively input from the first and second new and old current comparators;
the duty ratio subtractor for subtracting the duty ratio shift from the new duty ratio to produce a new duty ratio, if predetermined output signals are respectively input from the first and second new and old current comparators; and
the PWM signal generator for, if the new duty ratio, which has been increased or decreased according to the new duty ratios output from the duty ratio adder and the duty ratio subtractor, is input through the new duty ratio detector, modulating (PWM) a pulse width of a control signal according to the duty ratio, and outputting the result to the old duty ratio detector or the DC/DC converter.

2. A senseless MPPT control method of a photovoltaic power generation system, comprising:
a step (S21) of allowing a new and old current detector, connected to the current transformer, to detect a current introduced to the load, and to store the detected current;
a step (S22) of detecting a PWM duty ratio that was used previously and a PWM duty ratio that is currently being used and storing the detected PWM duty ratios;
a step (S23) of determining whether the new duty ratio ND is greater than the old duty ratio OD;
a step (S24, S25) of, if as a result of the comparison, the new duty ratio ND is greater than the old duty ratio OD (Yes in step S23) or the new duty ratio ND is smaller than the old duty ratio OD (No in step S23), determining whether a new current NC is greater than an old current OC;
a step (S26, S28) of, if, as a result of the comparison, the new duty ratio is greater than the old duty ratio (ND>OD) and the new current is greater than the old current (NC>OC) or the new duty ratio is smaller than the old duty ratio (ND<OD) and the new current is smaller than the old current (NC<OC), adding a duty ratio shift ratio $\Delta D$ to the new duty ratio ND (ND+$\Delta D$) to produce a new duty ratio;
a step (S27, S28) of, if, as a result of the comparison, the new duty ratio is greater than the old duty ratio (ND>OD) and the new current is smaller than the old current (NC<OC) or the new duty ratio is smaller than the old duty ratio (ND<OD) and the new current is greater than the old current (NC>OC), subtracting the duty ratio shift ratio $\Delta D$ from the new duty ratio ND (ND+$\Delta D$) to produce a new duty ratio; and
a step (S29) of allowing the PWM signal generator to generate a PWM signal corresponding to the new duty ratio and to control the DC/DC converter.

* * * * *